United States Patent
Sparenberg et al.

(10) Patent No.: US 9,015,211 B2
(45) Date of Patent: Apr. 21, 2015

(54) DEVICE FOR CACHING A SCALABLE ORIGINAL FILE

(71) Applicant: Fraunhofer-Gesellschaft zur Foerderung der angewandten Forschung e.V., Munich (DE)

(72) Inventors: Heiko Sparenberg, Nuremberg (DE); Siegfried Foessel, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 62 days.

(21) Appl. No.: 13/708,031

(22) Filed: Dec. 7, 2012

(65) Prior Publication Data

US 2013/0346456 A1 Dec. 26, 2013

Related U.S. Application Data

(60) Provisional application No. 61/568,716, filed on Dec. 9, 2011, provisional application No. 61/579,352, filed on Dec. 22, 2011.

(30) Foreign Application Priority Data

Feb. 2, 2012 (DE) .......................... 10 2012 201 534

(51) Int. Cl.
*G06F 17/30* (2006.01)
*H04N 21/2183* (2011.01)
(Continued)

(52) U.S. Cl.
CPC ...... *G06F 17/30091* (2013.01); *H04N 21/2183* (2013.01); *H04N 21/64792* (2013.01); *H04N 21/4331* (2013.01)

(58) Field of Classification Search
CPC ............ G06F 17/30091; G06F 3/0643; G06F 12/0806; G06F 17/30067; G06F 17/30038; G06F 17/30817; G06F 17/30849; G06F 12/0802; G06F 17/30; H04N 5/78; H04N 21/2183; H04N 21/4331
USPC .......... 707/825, 784, E17.005; 709/219, 244, 709/247; 382/233; 711/118
See application file for complete search history.

(56) References Cited

U.S. PATENT DOCUMENTS 6,272,598 B1 8/2001 Arlitt et al.
7,149,370 B2 * 12/2006 Willner et al. ................ 382/305
(Continued)

OTHER PUBLICATIONS

Hsiao-Ping Tsai; Jiun-Long Huang; Cheng-Ming Chao; Ming-Syan Chen—"SIFA: a scalable file system with intelligent file allocation"—Published in: Computer Software and Applications Conference, 2002. COMPSAC 2002. Proceedings. 26th Annual International Date of Conference: Aug. 26, 2002-Aug. 29, 2002 pp. 793-798.*

(Continued)

*Primary Examiner* — Anh Ly
(74) *Attorney, Agent, or Firm* — Keating & Bennett, LLP

(57) ABSTRACT

A device for caching a scalable original file having a first structure which has a header and a plurality of information packets for different information levels has a cache memory configured to cache a proxy file and/or information packets of the proxy file and a proxy file generator configured to generate a proxy file such that the latter is transferable into or directly has a second structure, which corresponds to the first structure of the original file. The proxy file generator further is configured to read out a first information packet of a basic information level from the original file and insert it into the proxy file at a position specified by the second structure and to output the proxy file in the second structure, so that in the second structure, at least one of the information packets of a non-basic information level is replaced with an empty information packet.

19 Claims, 9 Drawing Sheets

(51) Int. Cl.
*H04N 21/647* (2011.01)
*H04N 21/433* (2011.01)

(56) References Cited

U.S. PATENT DOCUMENTS

| | | | |
|---|---|---|---|
| 7,423,649 B2* | 9/2008 | Henocq et al. | 345/473 |
| 7,853,981 B2* | 12/2010 | Seo | 725/100 |
| 2002/0048450 A1* | 4/2002 | Zetts | 386/95 |
| 2002/0059458 A1* | 5/2002 | Deshpande et al. | 709/246 |
| 2002/0087728 A1* | 7/2002 | Deshpande et al. | 709/246 |
| 2002/0161911 A1 | 10/2002 | Pinckney, III et al. | |
| 2004/0175059 A1* | 9/2004 | Willner et al. | 382/305 |
| 2004/0267958 A1* | 12/2004 | Reed et al. | 709/238 |
| 2006/0112124 A1* | 5/2006 | Ando et al. | 707/101 |
| 2007/0165935 A1* | 7/2007 | Deshpande et al. | 382/132 |
| 2011/0219035 A1* | 9/2011 | Korsunsky et al. | 707/784 |
| 2011/0302618 A1* | 12/2011 | Odlund et al. | 725/109 |
| 2013/0067036 A1* | 3/2013 | Nooney et al. | 709/219 |
| 2013/0121421 A1 | 5/2013 | Bruns et al. | |
| 2013/0198454 A1* | 8/2013 | Sparenberg et al. | 711/118 |
| 2013/0346456 A1* | 12/2013 | Sparenberg et al. | 707/825 |
| 2014/0250212 A1* | 9/2014 | Karlsson et al. | 709/219 |

OTHER PUBLICATIONS

Michael K. Bradshaw et al.—"Periodic broadcast and patching services: implementation, measurement, and analysis in an Internet streaming video testbed" Proceeding Multimedia '01 Proceedings of the ninth ACM international conference on Multimedia Sep. 30-Oct. 1, 2001—pp. 280-290.*

Official Communication issued in corresponding European Patent Application No. 12198909.9, mailed on May 31, 2013.

Podlipnig et al., "Replacement Strategies for Quality Based Video Caching." Proceedings of IEEE International Conference on Multimedia and Expo; Aug. 26, 2002, pp. 49-52.

Paknikar et al., "A Caching and Streaming Framework for Multimedia," Proceedings of the Eighth ACM International Conference on Multimedia, Jan. 1, 2000, pp. 13-20.

Kangasharju et al., "Design and Implementation of a Soft Caching Proxy," Computer Networks and ISDN Systems 30, Nov. 25, 1998, pp. 2113-2121.

Sparenberg et al., "Virtual File System for Scalable Media Formats," 14th ITG Conference, 5 pages.

"Enhancements for Digital Cinema and Archive Profiles (Additional Frames Rates)," ISO/IEC JTC 1/SC 29/WG1 N5575, Oct. 12, 2010, 12 pages.

Oh et al., "Metafile-Based Scalable Caching and Dynamic Replacing Algorithms for Multiple Videos Over Quality-of-Service Networks," IEEE Transactions on Multimedia, vol. 9, No. 7, Nov. 2007, pp. 1535-1542.

Seagate Products & Services, Oct. 27, 2011, 2 pages.

"Digital Cinema System Specification V1.2," Aug. 30, 2012, 155 pages.

Sparenberg et al., "Virtual File System for Scalable Media Formats," 14th ITG Conference, 5 pages, Electronic Media Technology (CEMT), Mar. 23-24, 2011.

"Information Technology—JPEG 2000 Image Coding System," 2000, 236 pages.

"Enhancements for Digital Cinema and Archive Profiled (Additional Frames Rates)," ISO/IEC JTC 1/SC 29/WG1 N5575, Oct. 12, 2010, 12 pages.

Schwarz et al., "Overview of the Scalable Video Coding Extension of the H.264/AVC Standard," IEEE Transactions on Circuits and Systems for Video Technology, vol. 17, No. 9, Sep. 2007, pp. 1103-1120.

Yu et al., "MPEG-4 Scalable to Lossless Audio Coding," Audio Engineering Society Convention Paper 6183, Oct. 28-31, 2004, 14 pages.

Taubman et al., "Architecture, Philosophy, and Performance of JPIP: Internet Protocol Standard for JPEG2000," Visual Communications and Image Processing, Jun. 23, 2003, 20 pages.

Lino Monteagudo-Pereira et al., "Smart JPIP Proxy Server with Prefetching Strategies," 2010 Data Compression Conference, pp. 99-108.

Rejaie et al., "Multimedia Proxy Caching Mechanism for Quality Adaptive Streaming Applications in the Internet," IEEE Proceedings of the INFOCOM 2000, vol. 2, 2000. pp. 980-989.

Miao et al., "Scalable Proxy Caching of Video Under Storage Constraints," IEEE Journal of Selected Areas in Communications, vol. 20, No. 7, Sep. 2002, pp. 1315-1327.

Sparenberg et al.; "Cache Device For Caching"; U.S. Appl. No. 13/720,152; filed Dec. 19, 2012.

Wang, V. et. al, "System and Transport Interface of SVC", IEEE Transactions on Circuits and Systems for Video Technology, vol. 17, No. 9, Sep. 2007, pp. 1149-1163.

Wenger, S. et. al, "Transport and Signaling of SVC, in IP Networks", IEEE Transactions on Circuits and Systems for.Video Technology, vol. 17, No. 9, Sep. 2007, pp. 1164-1173.

* cited by examiner

DEVICE FOR CACHING A SCALABLE ORIGINAL FILE

CROSS-REFERENCE TO RELATED APPLICATIONS

This application claims priority from German Patent Application No. 102012201534.5, which was filed on Feb. 2, 2012, and from U.S. Patent Applications No. 61/568,716, which was filed on Dec. 9, 2011, and 61/579,352, which was filed on Dec. 22, 2011, all of which are incorporated herein in their entirety by reference.

Embodiments of the present invention relate to a device for caching a scalable file and to a method of caching a scalable file as well as to a computer program.

BACKGROUND OF THE INVENTION

A scalable file may be, e.g., an audio file or video file, such as a JPEG 2000 file wherein the information is stored at different levels. Said mechanism serves the purpose that the same file may be represented in a reduced resolution and/or reduced quality when a high-resolution and high-quality representation is not possible, e.g. due to the available computing performance of the CPU and/or the GPU. In this context, individual information packets of the data stream on the target machine are then discarded, so that the file is reduced to one dimension, e.g. the resolution or the signal-to-noise ratio. From that point of view, the missing decoding resources may be compensated for, on the target machine, by a smaller amount of data to be processed. Advantageous fields of application for such scalable media files are digital movie distributions, archiving and mastering, the file formats advantageously used being JPEG 2000, H.264 SVC or MPEG4 SLC. Image compression methods allowing the storage requirement to be reduced are also frequently used in such applications. In this manner, said image sequences may be compressed to a data rate of up to 250 MBit/s, one having to distinguish between lossy and lossless compression. In digital archiving, the data rates are typically higher than with digital cinema. In order to do justice to this purpose, a profile of its own having an increased data rate of 500 MBit/s is provided in the JPEG 2000 standard.

Real-time reproduction of such files consumes a large amount of resources, it also being possible by now, by using a standard PC, to provide the computing power that may be used for decoding compressed image sequences which may use high data rates by means of current algorithms, new processor families, and graphics cards. However, a further bottleneck in the processing chain of a standard PC has been identified which restricts real-time reproduction in particular with high data rates.

Current consumer hard disks, which typically have a data transmission rate of between 48 and 66 MB/s, are not able to provide the data to a decoder within the appropriate amount of time so as to be able to reproduce an image sequence, e.g. comprising 24 images (frames) per second and a data rate of 84 MB/s, in real time. This applies particularly to external USB hard disks or USB sticks which typically have data transmission rates of between 6 and 19 MB/s. Consequently, the reproduction software and/or the decoder may keep skipping images during reproduction, even if theoretically, the computing power that may be used for the decoding were available.

Current solutions for avoiding this bottleneck are based on utilizing faster hard disks having movable write and read heads. However, said hard disks are costly. A further possibility of ensuring higher data rates between the hard disk and the decoder is to utilize FLASH memories and/or SSD hard disks having data transmission rates of typically 117 to 125 MB/s, it being noted, however, that even in the event of parallel requests for several data streams, for example when reproducing several videos at the same time, a sufficient data rate cannot be guaranteed. Moreover, such FLASH memories are considerably more expensive than normal hard disks. Utilizing faster hard disks is not always possible, and particularly in the future it will have to be expected that image repetition rates as well as the amount of data per frame and, thus, the data throughput that may be used will increase, so that even the above-described generation of hard disks will soon be stretched to its limits. A further possibility of increasing the data throughput consists in combining several hard disks into a so-called RAID (redundant array of independent disks) system. This involves, e.g., using two or four hard disks in parallel to achieve higher writing and reading speeds. In particular with fixed installations, the performance of mass storages is increased by such RAID systems; however, said systems cannot be used, or can be used to a limited extent only, for mobile application (cf. USB hard disks).

Therefore, there is a requirement for an improved approach to overcome performance bottlenecks between the mass storage and the decoder or, generally, a processor.

SUMMARY

According to an embodiment, a device for caching a scalable original file which has a first structure having a header and a plurality of information packets for different information levels may have: a cache memory configured to cache a proxy file and/or information packets of the proxy file; a proxy file generator configured to generate the proxy file such that the proxy file is transferable into a second structure of its own account or directly has the second structure, said second structure corresponding to the first structure of the original file, the proxy file generator further being configured to read out a first information packet of a basic information level from the original file and insert it into the proxy file at a position specified by the second structure and to output the proxy file in the second structure, so that in the second structure, at least one of the information packets of a non-basic information level is replaced with an empty information packet.

According to another embodiment, a method of caching a scalable original file which has a first structure having a header and a plurality of information packets for different information levels may have the steps of: producing a proxy file such that the proxy file is transferable into a second structure of its own account or directly has the second structure, which corresponds to the first structure of the scalable original file; reading out a first information packet of a basic information level from the original file; inserting the first information packet into the proxy file at a position specified by the second structure; and providing the proxy file in the second structure, so that in the second structure, at least one of the information packets of a non-basic information level is replaced with an empty information packet.

According to another embodiment, a computer program may have: a program code for performing the method of caching a scalable original file which has a first structure having a header and a plurality of information packets for different information levels, which method may have the steps of: producing a proxy file such that the proxy file is transferable into a second structure of its own account or directly has the second structure, which corresponds to the first structure of the scalable original file; reading out a first information packet of a basic information level from the original file; inserting the first information packet into the proxy file at a position specified by the second structure; and providing the proxy file in the second structure, so that in the second structure, at least one of the information packets of a non-basic information level is replaced with an empty information packet, when the program runs on a computer.

Embodiments of the present invention provide a device for caching a scalable original file having a first structure comprising a header and a plurality of information packets for different information levels. The device comprises a cache memory configured to cache a proxy file and/or information packets of the proxy file, as well as a proxy file generator configured to generate a proxy file such that the proxy file is transferable into a second structure of its own account or directly comprises the second structure, said second structure corresponding to the first structure of the original file. The proxy file generator further is configured to read out a first information packet of a basic information level from the original file and insert it into the proxy file at a position determined by the second structure and to output the proxy file in the second structure, so that in the second structure, at least one of the information packets of a non-basic information level is replaced with an empty information packet.

The core of the present invention is to be able to use the scalability of, e.g., above-mentioned media files at the file system level for providing data to a processor and/or decoder in real time, even if the mass storage and/or a hard disk is too slow to transfer all of the requested data for all of the information levels. Specifically, scalable files, which typically comprise an information packet of a basic information level and information packets of a non-basic information level, offer the possibility of discarding, during execution, the information packets of the non-basic information level. Due to the missing information packets of the non-basic information level, the level of detail, e.g. a resolution or a quality (in a scalable media file) is admittedly reduced, the file per se nevertheless remaining representable. This is why empty data packets are transferred to the decoder instead of the information packets of the non-basic information levels, which comprise, e.g., information regarding extended (enlarged) resolution, an extended (improved) signal-to-noise ratio and/or a different extended component. This means that the device for caching replaces—prior to transferring the scalable (proxy) file to the decoder—the missing information packets which, e.g., have not yet been read in from the original file from the mass storage, with empty information packets such as so-called zero packets, so that the structure of a scalable file is maintained. Consequently, the decoder obtains the expected information packets, even if some of them have no information stored therein, and can perform the decoding task in a fault-free manner. For example, the missing information packets of the non-basic information level may result in a reduction of the resolution or the quality (signal-to-noise ratio). Despite this reduced information content, a scalable media file thus processed may be decoded and/or reproduced in a fault-free manner. By applying the scalability at the file system level for such media data, the data throughput is reduced in a controlled manner, which offers the advantage that real-time reproduction of high-quality media files is possible at the predefined frame rate, even if the data throughput rate of the employed mass storage medium were actually not sufficient.

In accordance with further embodiments, the original file or a set of original files comprises information packets for successive frames or is part of a set of original files comprising one original file for each of successive frames. This also means that a multitude of frames of a video are stored directly in the scalable original file (e.g. H.264) or that the multitude of frames are stored in a multitude of original files, which together form the set of original files (e.g. JPEG 2000), each frame being stored in a scalable original file of its own (frame storage). The proxy file generator is configured to read out a first information packet of a basic information level for a first frame from the original file or the set of original files and to insert the first information packet into the proxy file or the set of proxy files and to read out a further information packet of the basic information level for a subsequent frame from the original file or the set of original files and to insert said further information packet into the proxy file or the set of proxy files. The individual frames are temporally provided to a decoder or requested by the decoder, so that the individual frames of a video may be lined up to form a moving image sequence that may be reproduced in a fluent manner. In accordance with further embodiments, this takes place in accordance with a predefined frame rate.

In accordance with further embodiments, the proxy file generator is configured to repeat said readout and said insertion for information packets of the non-basic information level so as to reload the information packets which have not yet been read in for the current frame and/or for the current original file of the set of original files, and to thus increase the information content per frame. Said steps take place in dependence on the frame rate and on a readout speed of reading out the information packets from the original file. Said readout and insertion take place in accordance with further embodiments as long as the frame rate or the decoder itself predefines a change to the next frame. In accordance with further embodiments, said reading out and supplementing of the information packets of the non-basic information level may be continued when output of the current frame of the proxy file is finished, so that, thus, e.g. a reload of the information packets of the non-basic information level takes place in the background, or when there is repeated access to the proxy file to be cached, or to be buffered.

In accordance with further embodiments, the proxy file generator may further be configured to cache an information packet which has not been completely read out (a non-completed information package) into the cache storage or into a further memory without inserting the non-completed information package into the proxy file and/or caching the non-completed information package in such a manner that the proxy file may be output such that the non-completed information package is replaced with an empty information packet.

In accordance with further embodiments, the present invention provides a method of caching a scalable original file having a first structure comprising a header and a plurality of information packets for different information levels. The method comprises the step of producing a proxy file such that the proxy file is transferable into a second structure of its own account or directly comprises the second structure, which corresponds to the first structure of the scalable original file. The method further comprises the step of reading out a first information packet of a basic information level from the original file, and the step of inserting the first information packet into the proxy file at a position determined by the second structure. Moreover, the method comprises the step of providing the proxy file in the second structure, so that in the second structure, at least one of the information packets of a non-basic information level is replaced with an empty information packet. In accordance with a further embodiment, the present invention provides a computer program performing the above-described method.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
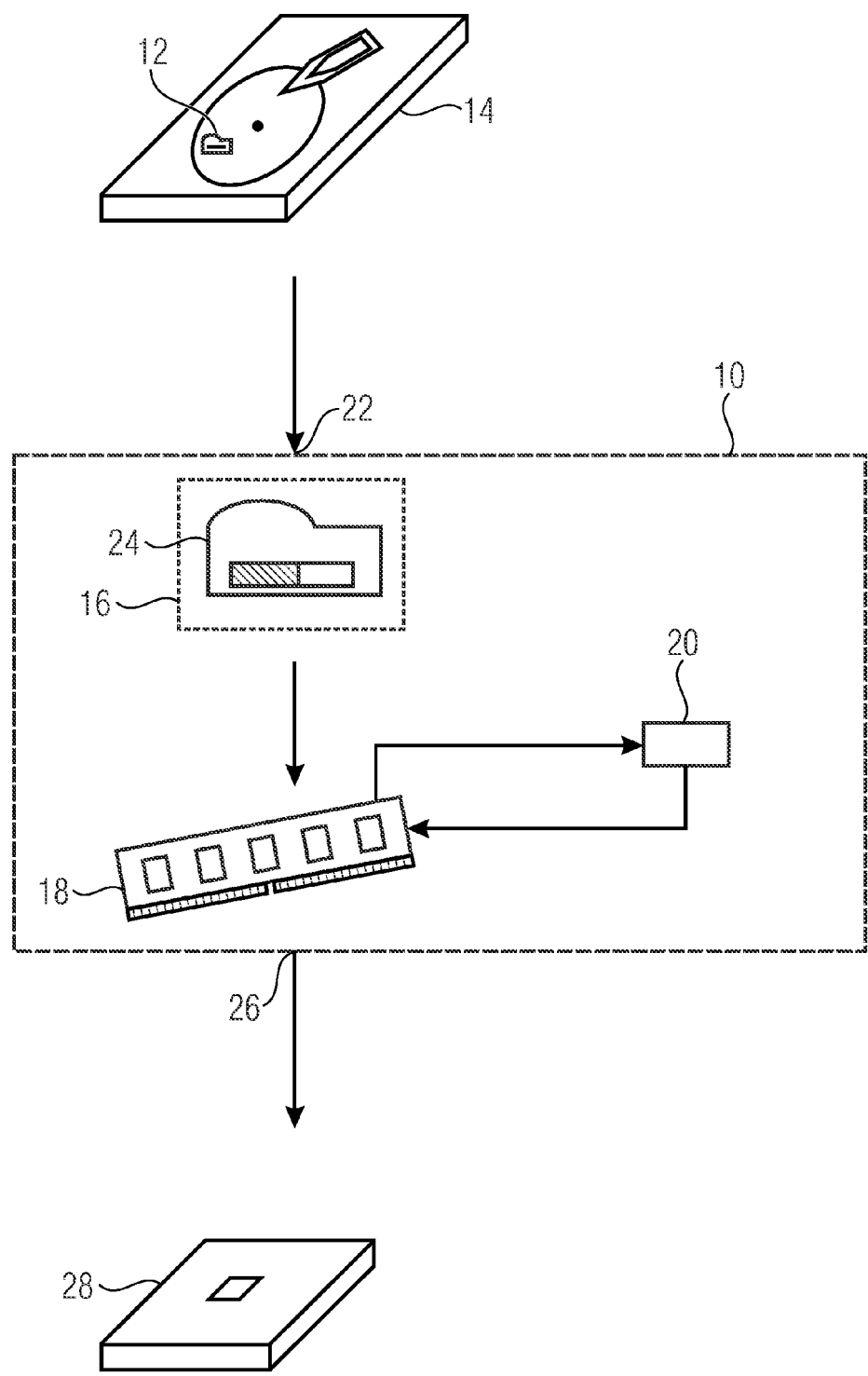
FIG. 1 shows a schematic representation of a device for caching a scalable original file by means of an integrated cache device.

Before embodiments of the present invention will be explained in more detail below with reference to the accompanying figures, it shall be pointed out that identical elements or elements having identical actions are provided with identical reference numerals, so that the descriptions of same are interchangeable or may be mutually applied.

FIG. 1 shows a device 10 for caching a scalable original file 12 which is stored, e.g., on a mass storage medium 14 such as a hard disk or any other physical medium. The device 10 for caching includes a proxy file generator 16 and a cache memory 18 as well as the optional cache device 20. The cache device 20 is connected to the cache memory 18 or may be part of the cache memory 18. The proxy file generator 16 and/or the device for caching 10 is connected to the mass storage medium 14 via a first interface 22 so as to read in the original file 12 or a plurality of original files of a set of original files and to cache it or them in the cache memory 18 as a proxy file 24. In addition, the device 10 comprises a second interface 26 by means of which the proxy file 24 or the plurality of proxy files of a set of proxy files may be output from the memory 18 to a decoder 28 or processor 28 comprising, e.g., a CPU (central processing unit) or GPU (graphics processing unit).

In the following, the functionality of the device 10 for caching one or more scalable original files 12 will be explained in detail along with the functionality of the cache device 20. A typical field of application of scalable files (cf. scalable original file 12 or scalable proxy file 24) comprises storing video sequences or audio titles in so-called media files having time dimensions. One has to distinguish between two types: on the one hand, a media file having a time component may be stored in an individual original file 12 including all of the information packets for successive frames. Typical representatives of this type are H.264 files. Another form of storing real-time media formats is employed with JPEG 2000, for example. Here, each frame is stored in an original file 12 of its own, so that the time component results from the fact that individual original files for successive frames belonging to a set of original files are represented one after the other. Irrespective of whether a multitude of frames are stored in the original file 12 and/or the proxy file 24 or in the set of original files and/or a set of proxy files, the files of both types of media files which have been described comprise comparable structures enabling scalability.

The structure of such a scalable file typically is defined by a header, a first information packet for a basic information level as well as by further information packets for a non-basic information level. In principle, the header and the first information packet of the basic information level are sufficient for reproducing and/or decoding such a scalable file. However, the decoder 28 typically awaits transferal of all of the information packets, announced by the header, of all of the information levels in the structure predefined by the original file 12, even if this were not absolutely necessary for decoding purposes. In other words, this means that for fault-free decoding, all of the information packets of all of the information levels are to be transmitted from the original file 12 to the decoder 28, or that at least the essential information packets are to be transferred to the decoder 28 as a proxy file 24 in such a manner that said proxy file 24 equals the original file 12 with regard to its structure.

To ensure this, the proxy file 24, which is equal in structure to the original file 12, is stored, e.g. as an empty file, in the cache memory 18 by the proxy file generator 16, said empty file in this form being executable in a compatible manner by any suitable decoder 28, irrespective of the error routine of the decoder 28. At least the header of the original file 12 and advantageously also the first information packet, read out from the original file 12, of the basic information level is inserted in the empty proxy file 24. Insertion takes place at the position determined by the structure, the missing information packets of the non-basic information level being replaced with empty information packets of equal size and arrangement. By means of this approach, the structure of the original file 12 is replicated; however, the information content in the cached proxy file 24 is reduced as compared to the original file 12.

The device 10 may be integrated into the file system and/or the operating system such that the decoder 28 or the application (decoding software) called up on the processor 28 directly accesses—in the event of an access operation to the original file 12, which may be part of the set of original files—the proxy file 24, which by analogy may be part of the set of proxy files. The above-mentioned time dimension of media files limits the time available during loading, since media files may be reproduced at a predefined frame rate or sampling rate so as to avoid stutters (in video reproduction) or dropouts (in audio reproduction). Consequently, the respective frame or sample may be transmitted within the predefined time window. If the transmission rate from the mass storage medium 14 to the decoder 28 is not sufficient, the device 10 described here offers the possibility of selectively discarding information packets of the non-basic information levels and thus reducing the data rate. As a result, during access the decoder 28 obtains only a specific portion of the requested data, e.g. the header and the first information packet; however, it obtains same within the time period that may be used, and it may thus reproduce the (scalable) media file and/or video or audio file in real time by exploiting the scaling at the file system level. In other words, a file system (combination of data carrier, driver and file system) which exploits the scalability of files enables compensating for bottlenecks in real-time reproduction and/or transferring a file which is operational to an unlimited extent, namely the proxy file 24, to the decoder 28 even if the data throughput between the mass storage medium 14 and the interface 22 is too low for the amount of data to be transmitted and the available time. Even though the method presented does not provide the original file 24 having the full resolution or the maximum signal-to-noise ratio, this is not necessary in many application scenarios, e.g. in the preview of a movie during post-production. It is much more important to ensure that the media file need not be additionally copied in its entirety onto a fast storage system in a time-consuming manner for a short preview.

In the event of a renewed request to the file system, information packets for non-basic information levels may be reloaded from the original file 12 or the set of original files and be inserted into the proxy file 24 or the set of proxy files. In this manner, the basic information may have added to it extended information with regard to extended resolution, with regard to extended quality or with regard to an extended component, such as depth information or a 3D component. This enables high-quality representation in repeated reproduction of the media file. Such reloading advantageously takes place when the proxy file 24 or the several proxy files of the set of proxy files are repeatedly called up by the decoder 28, so that the extended information packets for a frame within the time window in which the previous frame (or the previous proxy file of the set of proxy files) is output to the decoder 28, are supplemented to the information packets already stored, i.e. before the respective frame (or the respective proxy file) is made available to the decoder 28. This reloading typically is performed in an iterative manner for such time until all of the information packets of the one or more original files 12 have been transmitted into the one or more proxy files 24. Said iterative approach offers the advantage that when a media file is first called up, fast reproduction and/or preview may be effected with reduced quality, and that in the event of further calls, high-quality output is effected as of a predetermined frame (once additional non-basic information levels have been successfully reloaded). The number of iterations depends on the frame rate, on the one hand, and on the readout speed and the file size of the original file 12 or of the set of original files, on the other hand. Said iterative reloading described above alternatively is effected in the background, i.e. when the mass storage medium is not being accessed and/or when the first provision of the one or more proxy files 24 is finished. Storing the proxy file 24 in the cache memory 18 also serves the purpose that, in the event of repeated requests, they are completely and directly made available to the decoder 28 without requiring access to the mass storage medium 14.

Should the cache memory 18 be full or should there be less storage space available than may be used for storing a further file, the cache memory 18 may free up (unblock, or mark as deletable) storage space in accordance with a displacement strategy on the part of the cache device 20.

All of said caching strategies aim at deleting those files from the memory which will most likely not be required again in the short term. With the displacement strategy, one exploits the scale-down capability of the stored proxy files 24 or, generally, of several stored scalable files. To this end, the cache device 20 analyzes the content of the cache memory 18 and selectively frees up storage locations of the proxy file 24 which have information packets of non-basic information levels stored therein. Said freeing-up of the storage locations is effected in accordance with the displacement strategy selected so that, for example, any empty or not completely stored information packets are the first to be discarded and/or to be marked as freed up, or that any most detailed extension information levels are the first to be freed up. In accordance with a further displacement strategy, freeing-up of storage space may be effected such that, for all of the frames, the quality is first of all reduced to 50% of the original quality of the original file 12 or of the set of original files, and, subsequently, the resolution is reduced down to 50% or 25% of the original resolution. As an alternative, it is also possible to reduce the resolution and the quality at the same time. Should there be, additionally, a requirement of further free storage space, the freeing-up may be effected in accordance with modified displacement strategies for scalable files or in accordance with conventional displacement strategies, such as in accordance with the FIFO strategy, wherein that file which was the first to be read in is displaced.

During freeing-up of storage space, the cache device 20 logs which information packets of the proxy files 24 have been discarded so as to replace, during repeated output of the proxy file 24 or of the set of proxy files, the discarded information packets with empty information packets and/or with information packets newly loaded from the original file 12 or the set of original files. Thus, again, each proxy file 24 is output by the device 10 such that the proxy file 24 is provided in the corresponding structure of the original file 12. Thus, there is an effect of compressing the proxy file 24 stored in the cache memory 18 without impairing the overall functionality. In the event that such information packets which contain extension information of a non-basic information level are discarded, the information content of the proxy file will be reduced, e.g. in that the resolution is reduced. In the event that only empty or incompletely stored information packets are discarded, the information content will remain constant, since only such packets which have been completely read in will be transferred to the caller.

Figure 2:
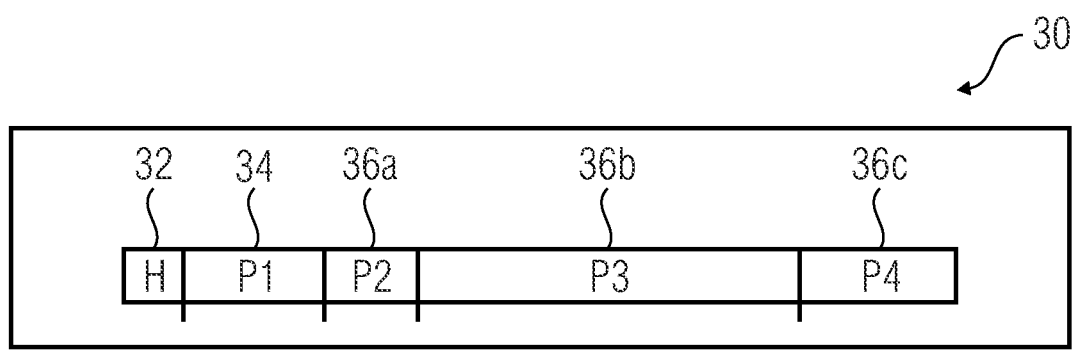
FIG. 2 shows a schematic representation of a scalable file.

With reference to FIG. 2, the fundamental structure of a scalable file, such as of an individual JPEG 2000 file of a set of files, of an H.264 SVC file or of an MPEG4 SLC file, will be explained in detail. Scalability is based, e.g., on increments and/or on incremental image resolution or incremental quality. FIG. 2 shows a data stream 30 of, e.g., a scalable JPEG 2000 file for a first frame, said data stream comprising a header 32, an information packet 34 for a basic information level as well as three information packets 36a, 36b, and 36c for non-basic information levels. The information packets 34, 36a, 36b, and 36c are arranged in a specific order which, together with the sizes of the respective information packets 34, 36a, 36b, and 36c, defines the structure, the individual information packets 34, 36a, 36b, and 36c not necessarily having to have the same lengths. This first structure of the original file 30 is stored as structural information in the header 32. It shall be noted that the individual information packets 34, 36a, 36b, and 36c optionally each may have a header of their own which contains, e.g., structural information about the respective information packets 34, 36a, 36b, and 36c.

The information packets 36a, 36b, and 36c of the non-basic information levels, which are also referred to as extension information levels, extend the information of the basic information level stored in the information packet 34, and contain, e.g., information serving to increase the resolution or to improve the quality and/or signal-to-noise ratio of the image file stored in this frame (cf. increments). From that point of view, the information packets 36a, 36b, and 36c are the so-called detail packets which are not absolutely required for reproducing the respective file. However, simply discarding said information packets 36a, 36b, and 36c at the file system level, e.g. when ascertaining missing data throughput rates of the data carrier (I/O performance) would change the first structure of the original file 30 to be reproduced and/or of the data stream 30 such that an error in the decoder or in the decoding software might be caused. The background of this is that a decoding software or a decoder assumes, on the basis of reading out the header 32 and the structural information stored therein, that an image file having a specific number of information packets, file size and resolution is provided. By simply discarding the information packets 36a, 36b, and 36c, however, the file size and the structure, i.e. the position of the individual information packets within the data stream, would change, so that a decoding software or a decoder would not be able to respond to such a spontaneous change. To avoid such errors, the discarded information packets may be replaced with empty information packets which restore the structure to be expected, as is explained with reference to FIG. 1. The precise approach during incomplete reading in of the data stream 30 or during supplementing of the data stream 30 by empty information packets will be explained in more detail with reference to FIG. 3.

FIG. 3a shows the data stream 30 of an individual image (frame) representing the original file, whereas FIG. 3b illustrates reading of the information packets into the proxy file 38 from the original file 30. The differences in quality, depending on the readout status (readout progress) of the proxy file 38 are illustrated in FIG. 3c. As was explained above, the original file 30 represented here comprises the first structure, which is defined by the sequence and sizes of the individual information packets 34, 36a, 36b, and 36c. In the first step, i.e. in initialization, an empty proxy file 38a, which includes the header 32 as well as empty information packets instead of the information packets 34, 36a, 36b, and 36c, is generated by the proxy file generator on the basis of the structural information of the header 32 which has been read in. The header 32 of the proxy file 38a corresponds to the header 32 of the original file 30.

The empty information packets are generated in such a manner that they form a second structure of the proxy file 38a, which corresponds to the first structure of the original file 30. This is why the individual empty information packets are equal in size to the information packets of the original file 30 and are arranged at a position predefined by the second (or first) structure. Said empty information packets may be filled with zeros, for example, or may have a different regular bit sequence from which no extended information results. The storage space is reserved for a predefined information packet by means of a zero packet. In other words, this means that the meta data of the proxy file 38a and of the original file 30 are identical, the information packets 34, 36a, 36b, and 36c being substituted for the time being. When reproducing said proxy file 38a, a JPEG 2000 decoder would output a gray image since no information packets, or only so-called zero packets, have been inserted into the proxy file 38a as yet.

Reading in and insertion of the information packets 34, 36a, 36b, and 36c, which are substituted for the time being, is performed in the next step. In the proxy file 38b, the first information packet 34, which contains information of the basic information level, is read in from the original file 30 and inserted after the header 32. As may be seen from the gray bar, parts of the second information packet 36a have also been read in; however, they cannot be used since the second information packet 36a have not been completely read in and/or copied into the proxy file 38b. In other words, this means that the information packets 32, 34, 36a, 36b, and 36c and/or the data stream of the information packets 32, 34, 36a, 36b, and 36c are cached in the cache memory 18 without taking into account the limits of the individual information packets 32, 34, 36a, 36b, and 36c. For outputting the proxy file 38b, the information packet 36a which has been partly, or incompletely, read in as well as the information packets 36b and 36c, which have not been read in, are replaced with empty information packets (zero packets); all of the information packets 34 which have been completely read in are returned to the decoder. For the decoder this means that from a specific point onwards, it will obtain empty information packets only, which has the same effect as obtaining no more packets. Even though the existence of the empty information packets adds no further detailed information to the image so far decoded, it will enable adherence to the data structure of same, including the internal architecture. The image 40a is the result of the proxy file 38b being decoded and is based exclusively on information of the basic information level (cf. information packet 34). Consequently, the image 40a comprises marked block artifacts which may be attributed to the missing information packets 36a, 36b, and 36c of the extension information level.

In parallel with reading-in of the information packets 34 and 36a, the information packets which have not yet or not been completely read in are logged by means of a so-called read-in status, which indicates information packets 36a, 36b, and 36c of the non-basic information level which are yet to be loaded. On the basis of this read-in status, the device may continue reading in, for repeated read-in, at that location where the previous read-in operation was aborted.

When read-in is continued, the second information packet 36a of the non-basic information level is completed, and parts of the third information packet 36b are read in, which results in the proxy file 38c. The second information packet 36a is inserted into the proxy file 38c at that location, predefined by the structure (after the first information packet 34) which was reserved by an empty information packet in the proxy file 38b. In the next read-in operation, the third information packet 36b continues to be completed, so that the proxy file 38d is produced. Here, the third information packet 36b is not completely read in (cf. gray bar), so that the latter in turn is replaced with an empty information packet. The image 40b results from the representation of the proxy file 38c and the proxy file 38d and illustrates the improved resolution as compared to the image 40a, which is the result of the information of the information packet 36a which was taken into account, i.e. information of an extension information level.

The proxy file 38e, which has been completed during further read-in, contains, in addition to the information packet 34 of the basic information level, all of the information packets 36a, 36b, and 36c of the non-basic information level. The image 40c is the result of the decoding of the proxy file 38e. Since all of the information of the information packets 36a, 36b, and 36c of the non-basic information levels are processed in the image 40c, the latter consequently has an increased resolution and/or quality as compared to the images 40a or 40b, said resolution and/or quality corresponding to the resolution and/or quality stored in the original file 30. In summary, it may be stated that, as expected, the quality of the images 40a to 40c will be the better, the fewer data had to be replaced in the proxy file by the device.

Figure 4:
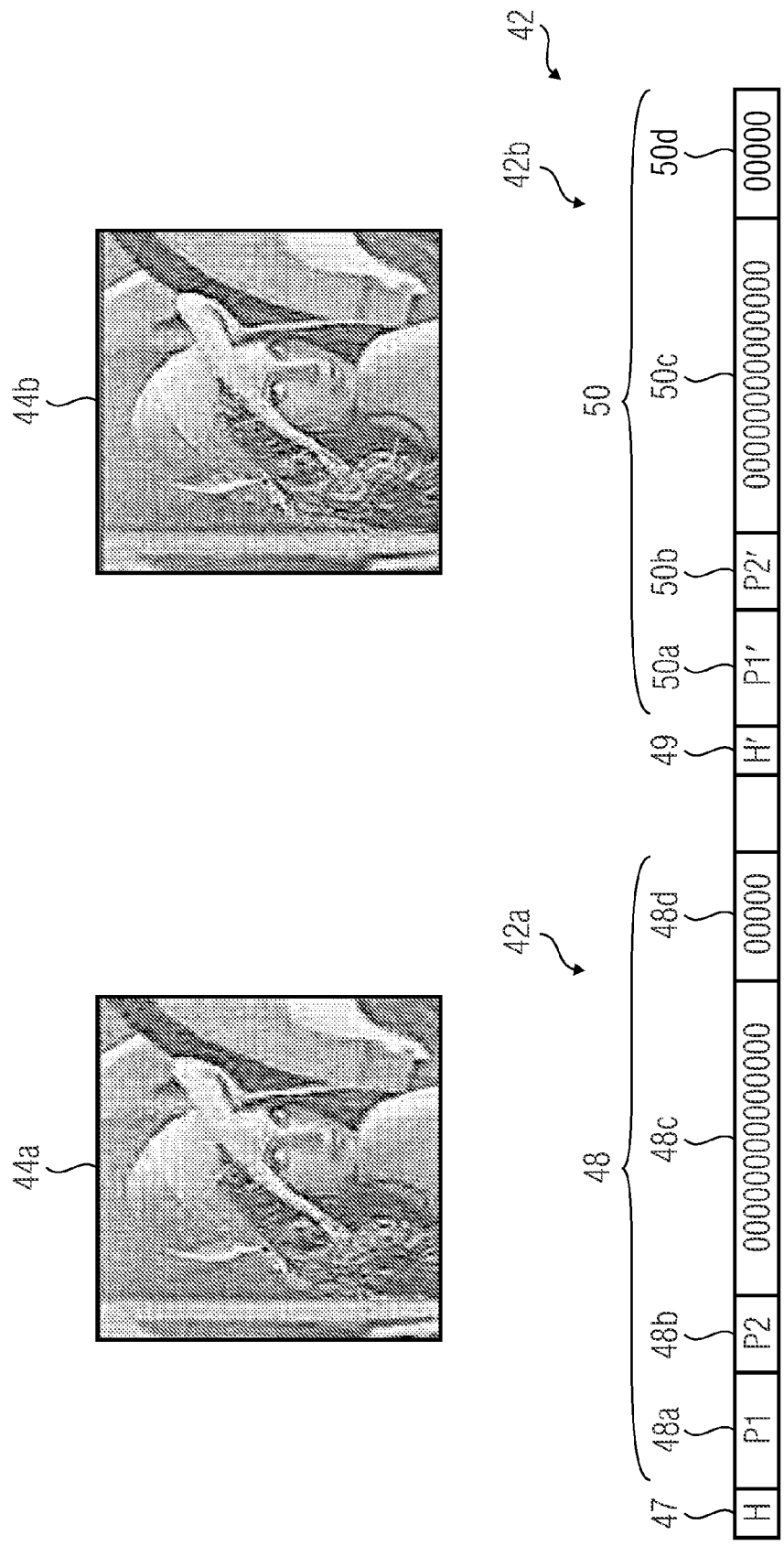
FIG. 4 shows a schematic representation of a data stream for two successive frames of a moving image sequence.

FIG. 4 shows a set of proxy files 42 having an image sequence stored therein. The image sequence includes two successive frames 44a and 44b, each frame being stored in a proxy file 42a and 42b, respectively. The set of proxy files 42 comprises a first proxy file 42a having a first header 47 as well as information packets 48 for the first frame 44a, and a second proxy file 42b having a second header 49 as well as information packets 50 for the second frame 44b. Each header 47 and 49, respectively, for the respective proxy files 42a and 42b provides information about the number of information packets which follow within the current frame and about the size of each individual information packet. In the set of original files, the first original file comprises, for the first frame 44a, a first information packet 48a of the basic information level as well as three further information packets 48b, 48c, and 48d of the non-basic information level. The second original file of the set of original files for the second frame 44b also comprises four information packets 50, of which the first information packet 50a belongs to the basic information level and the three further information packets 50*b*, 50*c*, and 50*d* belong to the non-basic information level.

The two successive frames 44*a* and 44*b* are reproduced e.g. at a frame rate of 24 images (frames) per second (fps), so that the time between read-in of the first proxy file 42*a* with the information packets 48 of the first frame 44*a* and of the second proxy file 42*b* with the information packets 50 of the second frame 44*b* is limited. The mass storage medium is too slow to provide all of the information packets 48 and 50, respectively, for the two successive images 44*a* and 44*b* within a specific amount of time, so that the specific number of images having the predetermined frame rate cannot be output at the full data rate. This is why in the first proxy file 42*a*, the incompletely or not loaded information packets, e.g. 48*c* and 48*d*, are replaced with empty information packets, so that from a specific point in time, the header 49 and the information packets 50 may be loaded for the subsequent frame 44. For the example shown, this means that for reproducing the set of proxy files 42, first of all the header 47 and, subsequently, the first information packet 48*a* of the basic information level as well as the second information packet 48*b* of the non-basic information level may be read out and cached for the first frame 44*a*. In the transferal of the first proxy file 42*a* to the decoder, the further information packets 48*c* and 48*d* are replaced with empty information packets prior to provision. The information packet which is read out next is the header 49 of the second proxy file 42*b*. In this second proxy file 42*b*, too, the first two information packets 50*a* and 50*b* are read out, and the last two information packets 50*c* and 50*d* are replaced with empty information packets.

The timing as to when the device stops loading the information packets 48 of the first proxy file 42*a* and starts loading the information packets 50 of the second proxy file 42*b* may be determined by two different mechanisms. For example, triggering may be performed by means of a signal on the part of the decoder or a different receiver of the set of proxy files 42 which instructs the device to end loading of the information packets 48 and to output the proxy file 42*a* (after insertion of the empty information packets 48*c* and 48*d*) and to start loading the information packets 50. A further possibility is for the proxy file generator to autonomously determine the change between the frames 44*a* and 44*b* on the basis of the frame rate, which basically predefines the time period between two successive frames 44*a* and 44*b*, and determines on the basis of the readout speed of the information packets from the mass storage medium, and adapts readout and provision of the information packets 48 and 50 accordingly. In this context, the device may optionally include a readout speed determiner.

Replacing the non-loaded information packets 48*c*, 48*d*, 50*c*, and 50*d* with empty information packets (zero packets) in the cache memory corresponds to dedicating storage space to the respective information packets 48*c*, 48*d*, 50*c*, and 50*d*. Alternatively, it is also possible for the empty information packets to be inserted or copied into the data stream and output when being provided. In this context, the empty information packets 48*c*, 48*d*, 50*c*, and 50*d* are generated on the basis of structural information and are provided, when being output, such that the second structure of the proxy files 42*a* and 42*b* corresponds to the first structure of the original files. This offers the advantage that there is no dedication of the storage space by empty information packets and, thus, no storage space is wasted. If at a later point in time the information packets 48*c*, 48*d*, 50*c*, and 50*d* are read in and cached, they will typically be stored in storage locations not directly associated with the storage locations of the information packets 48*a*, 48*b*, 50*a*, and 50*b*, so that fragmentation will occur.

In such cases, information about the relationship between the fragmented information packets 48 and 50, respectively, are stored in a separate database, so that combining the information packets 48 and 50, respectively—which belong together—will be possible during output.

Figure 5:
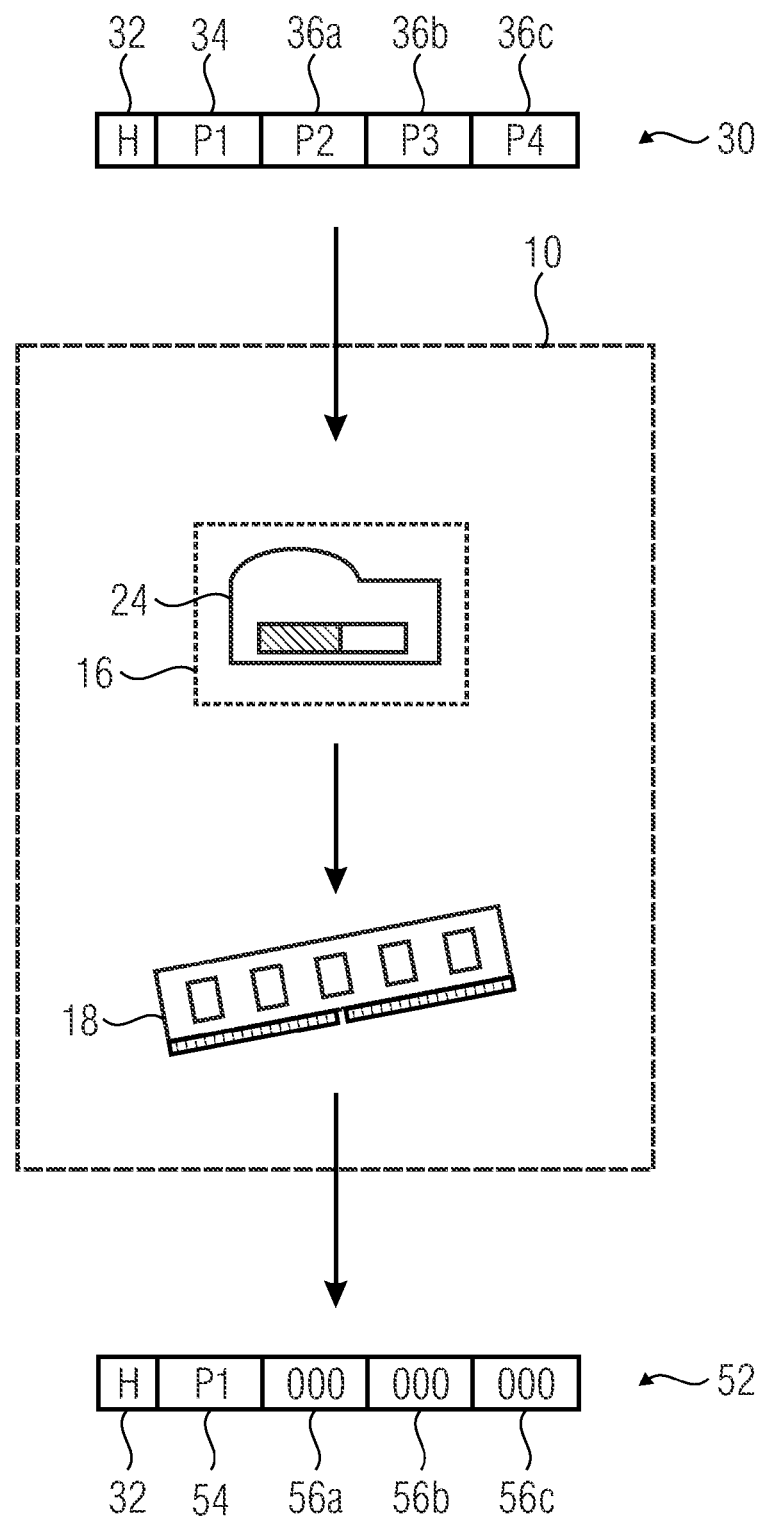
FIG. 5 shows a schematic representation of a device for caching in accordance with an embodiment.
Figure 6:
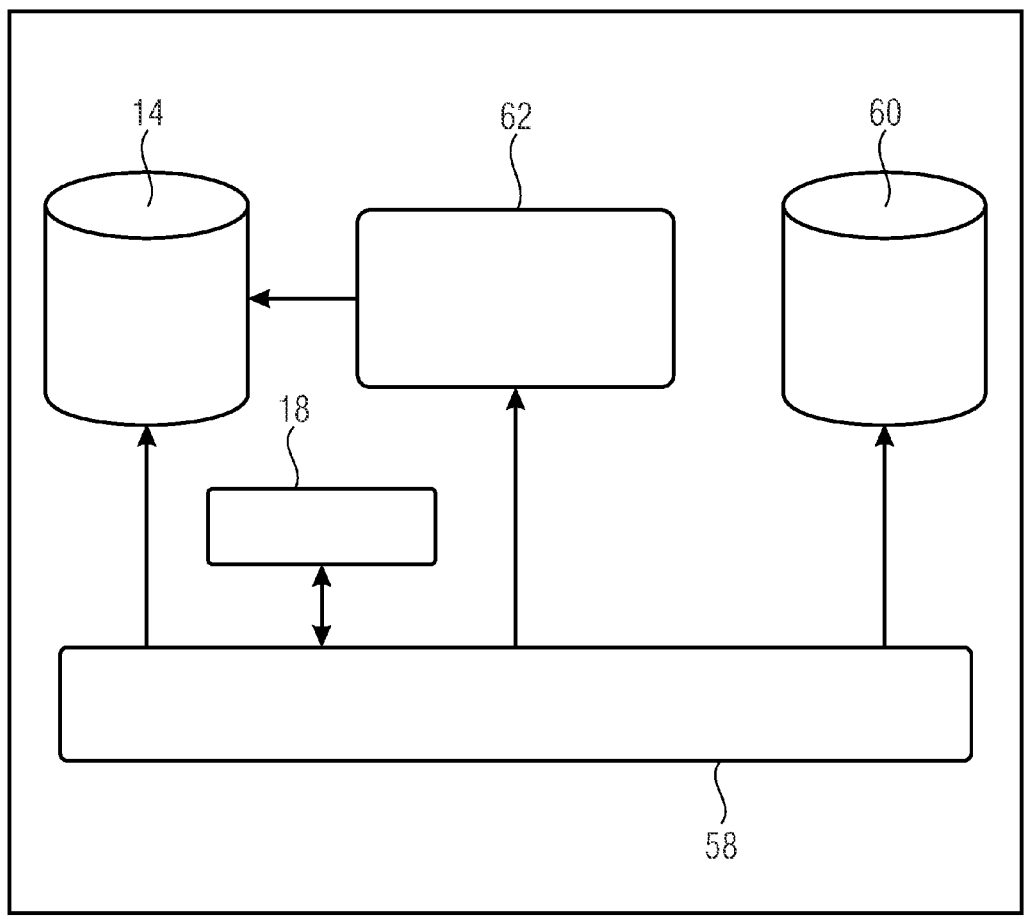
FIG. 6 shows a schematic representation of a file system that is extended by a device for caching in accordance with an embodiment.

With reference to FIG. 1 to FIG. 4, a system is described for processing a scalable file, said system comprising a device for caching the scalable file and a cache device. With reference to FIG. 5 and FIG. 6, the device 10 for caching the scalable original file 30, which is part of a set of original files, for example, will be described in detail.

FIG. 5 shows an embodiment of a device 10 for caching a scalable original file 30 having a first structure comprising a header 32 and a plurality of information packets 34, 36*a*, 36*b*, and 36*c* for different information levels. As was already explained with reference to FIG. 1, the device 10 comprises a cache memory 18 as well as a proxy file generator 16. The cache memory 18 is configured to cache a proxy file 52, which may also be part of a set of proxy files, and/or information packets 54, 56*a*, 56*b*, and 56*c*. The proxy file 52 is generated by the proxy file generator 16 such that it comprises a second structure which corresponds to the first structure of the original file 30 with regard to the order and sizes of the information packets 34, 36*a*, 36*b*, and 36*c*. This means that the proxy file 52 comprises the header 32 as well as the same number of information packets 54, 56*a*, 56*b*, and 56*c*, the information packets 54, 56*a*, 56*b*, and 56*c* having the same sizes as the information packets 34, 36*a*, 36*b*, and 36*c*. As was already mentioned above, it is also possible, alternatively, for the proxy file 52 to be stored such that it is transferable into a second structure of its own account. In addition, the proxy file generator 16 is configured such that it reads out the first information packet 34 of the basic information level from the original file 30 and inserts it into the proxy file 52 at the position determined by the second structure, as is illustrated by means of the first information packet 54 of the proxy file 52. In addition, the proxy file generator 16 replaces, when outputting the proxy file 52, at least one of the information packets 56*a*, 56*b*, and/or 56*c* of the non-basic information level with an empty information packet (illustrated by a zero packet here) so as to be able to output the proxy file 52 in the second structure without completely reading out the original file 30 or the set of original files.

The device 10 may also comprise a further cache memory, for example, configured to cache the read-in data stream of the information packets 34, 36*a*, 36*b*, and 36*c* in advance and/or to cache, in particular, such information packets 36*a*, 36*b*, and 36*c* which have been read in incompletely.

It shall be noted that the device 10 may also comprise, in accordance with further embodiments, the aspects mentioned above with regard to caching structural information, with regard to logging the read-in status and with regard to frame rate-dependent reading in and outputting of successive frames. In addition, the device 10 may be combined with the cache device 20.

In accordance with further embodiments, the device 10 may comprise the transmission rate determiner mentioned in FIG. 4 which enables, on the one hand, ending read-in of the information packets of the one frame and starting to read in the information packets of the subsequent frame in a synchronized manner, so that the optimum image quality is generated in dependence on the transmission rate, and enables, on the other hand, predicting the behavior of the mass storage medium even if the transmission rates may change, e.g. as a result of write or read requests of the operating system or requests from various applications or decoding applications.

FIG. 6 shows an implementation of the device 10 in the form of an extended file system. FIG. 6 shows a file system 58 by means of which a file, which is stored at different locations, for example, may be accessed. The file system accesses the mass storage medium 14 and the cache memory 18 on the one hand; the association as to where the individual information packets of the file to be accessed are located is stored in a database 60. This database 60 may also include fragmentation information about the proxy files which are stored in the cache memory and are fragmented. During integration in the device for caching into the file system 58, the mass storage medium 14 and the cache memory 18 are arranged in parallel. Moreover, a so-called media depacking unit 62 is provided for the file system 58, said media depacking unit basically corresponding to the proxy file generator. Said media depacking unit 62 distributes the individual information packets among the mass storage medium 14 and the cache memory 18, so that the file to be called up may be called up via the file system 58 at a maximum data rate. By implication, this means that the file system 58 or the device for caching is configured to access—when the original file or the set of original files is called up—information packets stored in the cache memory 18 and information packets stored in the mass storage medium 14 in parallel and to combine them into a data stream prior to output via the virtual file system 58.

Said virtual file system 58 may be integrated into the file system or the file system tree of the operating system. Consequently, it is advantageous for the response times of the file system to be reduced, which ensures real-time reproduction of scalable media files without restricting user-friendliness. Due to the fact that the association of the storage spaces is stored in the database 60 which may be accessed via the virtual file system 58, the internal architecture of the file system is transparent. From this point of view, this virtual file system 58 presented behaves as a standard file system, so that it makes no difference to the application and/or to the decoder calling up the file whether the file is stored on the mass storage medium 14, on the cache memory 18 or in such a manner that it is distributed among the mass storage medium 14 and the cache memory 18.

The improvement in real-time reproduction of JPEG 2000 files on a standard PC by the described device is explained by means of the diagrams shown in FIG. 7. A JPEG 2000 file having a sequence of images is used as a test file, each image comprising an average file size of 3.5 MB and a resolution of 2 k. There are four resolution stages and five quality stages available for each image, so that the file is scalable by means of said stages. Each data stream contains 75 information packets. When assuming that the file system provides 24 fps to enable real-time reproduction, the response time will amount to ≤42 ms for each frame, which corresponds to a data throughput of 84 MB/s.

Figure 7A:
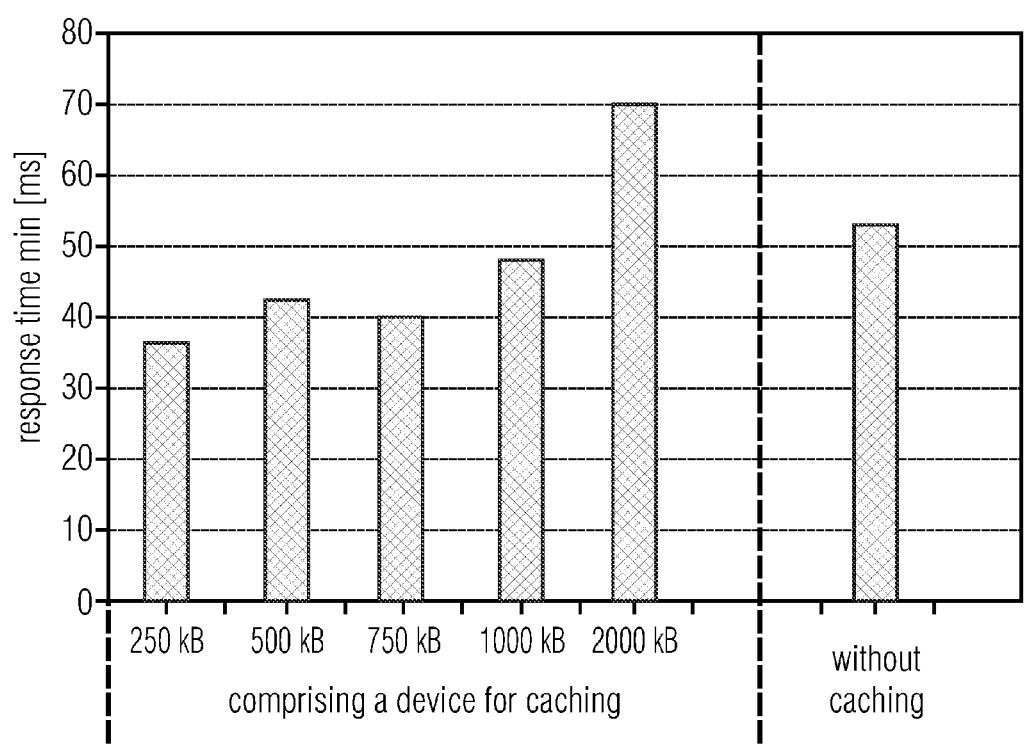
FIGS. 7a-7c show schematic diagrams of data throughput rates when using the device for caching in different juxtapositions.

FIG. 7a shows the measurement results in a hard disk speed measurement or measurement of the minimum response time of the hard disk. Here, the minimum response times when using a device and/or file system described above for caching is compared to the minimum response time without caching. The minimum response times were determined on the basis of a standard PC having a convention hard disk. It is noted that in the utilization of the device for caching, the minimum response times are classified for various block sizes. In this context, one assumes a request of an image from a decoder, which request is made to the virtual file system, the virtual file system forwarding the request to the conventional hard disk. Subsequently, the original file is transmitted from the hard disk into the cache memory in dependence on the block sizes of 250 KB, 500 KB, 750 KB, 1000 KB or 2000 KB, and the incomplete or missing parts are replaced with empty information packets, as was described above.

As may be seen from the diagram, the minimum response time for a conventional hard disk without any device for caching amounts to 52 ms, which corresponds to a maximum data throughput of 66 MB/s. This means that real-time reproduction at 24 frames per second (24 fps) is not possible here. With the aid of the device for caching, real-time reproduction may be enabled at a block size of 250 KB and 750 KB, since here, the average response times of 36 ms and 41 ms, respectively, are smaller than the 42 ms that may be used.

The larger the file size of the original file, the higher the efficiency of the device will be, since a conventional hard disk can only provide a fixed data rate in a continuous manner, and since, consequently, the number of frames per second would decrease in the event of a larger file size, whereas the performance would not deteriorate in the event of using the device for caching. This means that the performance remains constant, since the defined block sizes would be read out from the original file, and the missing information packets and/or empty information packets would be replaced. In the event of a reduction of the block size, e.g. 250 KB, the response time would be further reduced, which enables also employing slower mass storages, e.g. USB sticks or optical drives, or network-tied streaming applications for such (real-time) applications. Since the data throughput performance is dependent on the block size, further improvement of the data throughput may be achieved by using a dynamic block size. By means of said test files, the displacement strategy from the cache memory for scalable media data has also been investigated. It has been found that freeing up storage locations which contain information packets for very detailed non-basic information levels has no influence on the preview function of the media file since in the second request for the media file typically all of the information packets for all of the information levels may be loaded into the cache memory again. This is shown by means of FIG. 7b.

Figure 7B:
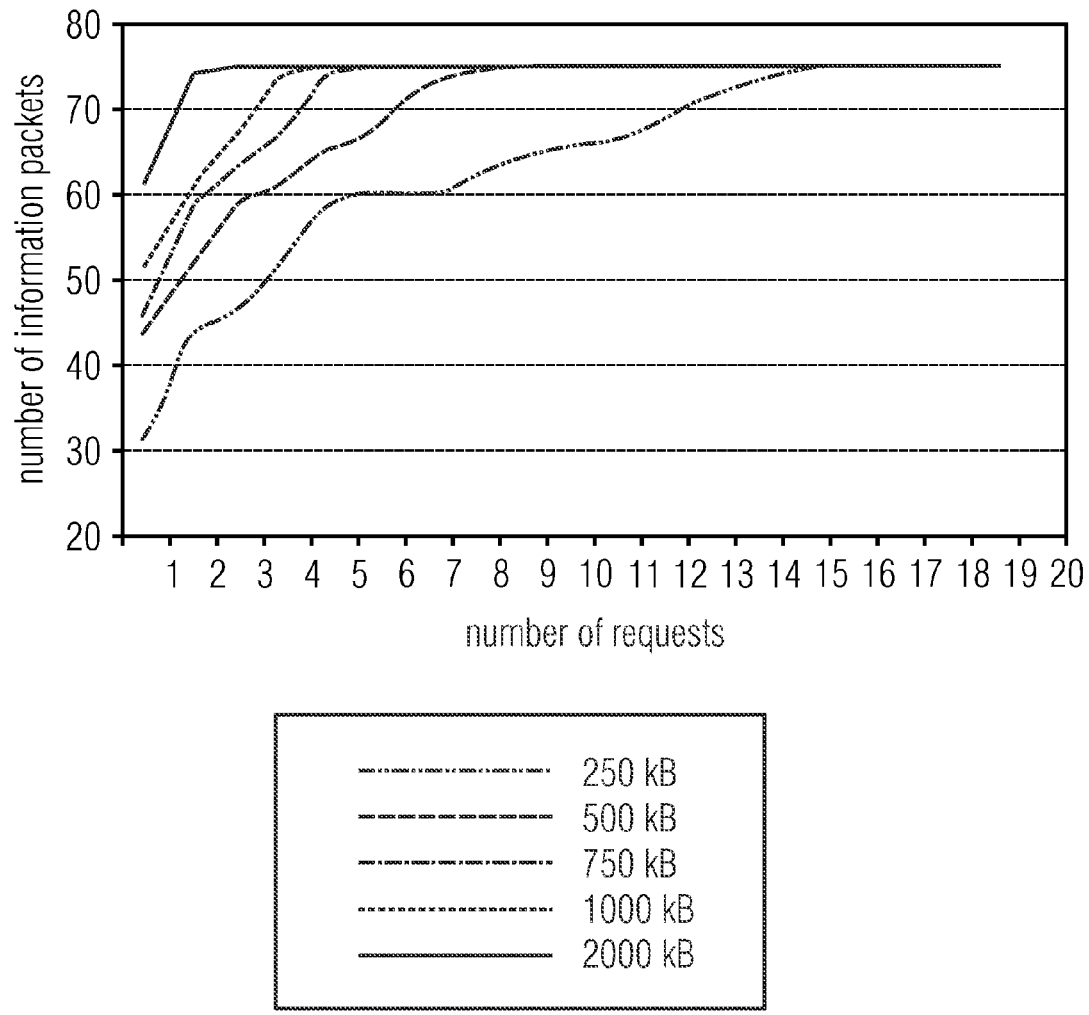

FIG. 7b shows the number of information packets of the test file (data packets) in the cache memory, plotted over the number of requests made to the virtual file system and/or the device for caching. As may be seen, various diagrams are depicted for the different block sizes. It may be seen that the larger the block size, the fewer requests may be used for completely storing the test file into the cache memory. One may see that when utilizing a block size of 700 KB, more than 50% of all of the 75 information packets of the scalable file will be stored in the cache memory following the first access to said scalable file, which is sufficient for preview purposes. This is true in particular when small display sizes are used.

Figure 7C:
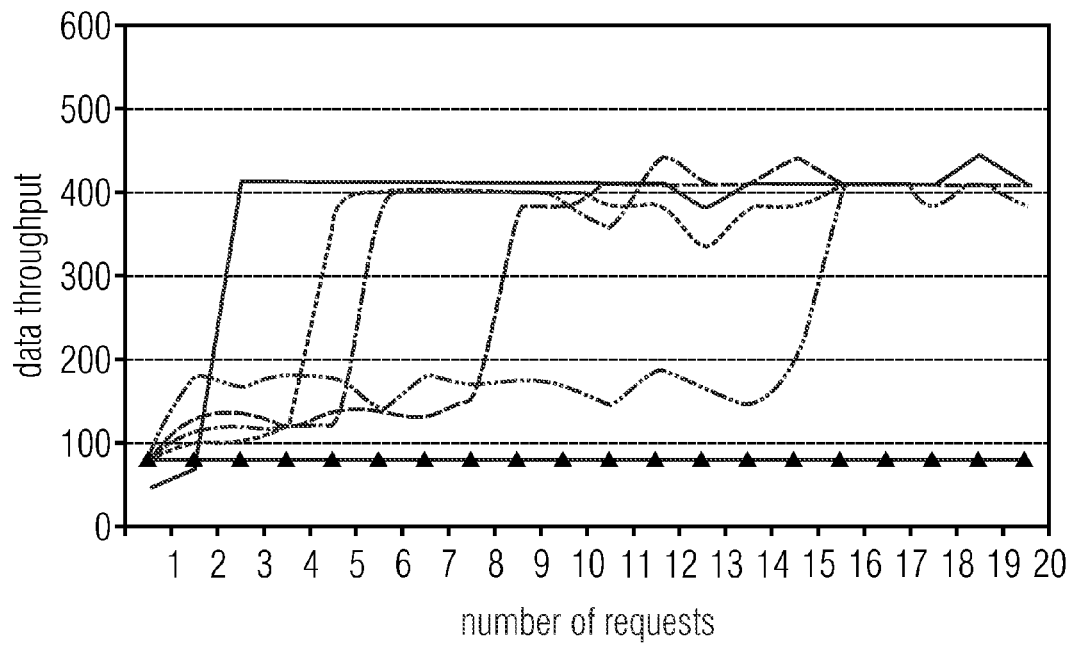
Figure 7C:
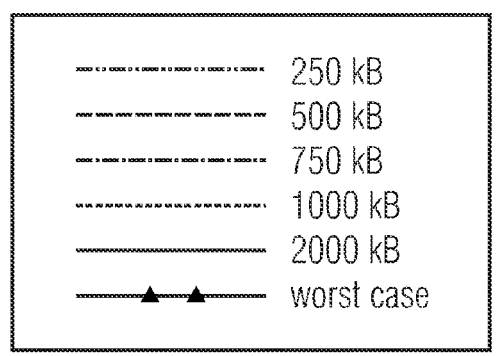

FIG. 7c shows the resulting data rate between the requester of the information packets, e.g. decoder and the device for caching and/or the virtual file system in dependence on the number of requests. Here, the data rate is again represented for different block sizes. As may be seen, the data rate increases in an irregular manner until all of the information packets of the proxy file or of the set of proxy files have been completely cached in the cache memory. The performance increases up to 410 MB/s. A higher performance may be achieved by directly integrating the device into a non-virtual file system. As a result of said transfers, the overall system performance will be reduced. Relocation of the file system to the system kernel (implementation of the file system in the system kernel), for example by means of a port, might significantly improve performance.

Even if aspects of the scalable file were explained above in connection with a JPEG 2000 file, it shall be noted that said device is applicable for any scalable files, such as H.264 SVC files or MPEG4 SLC files, for example.

With reference to FIG. 1, it shall be noted that in accordance with further embodiments, the device 10 and/or the proxy file generator 16 not only output the proxy files 24 to the decoder 28 via the interface 26, but also obtain control signals, e.g. start-stop of reproduction of an image sequence, from same via the interface 26.

Figure 3:
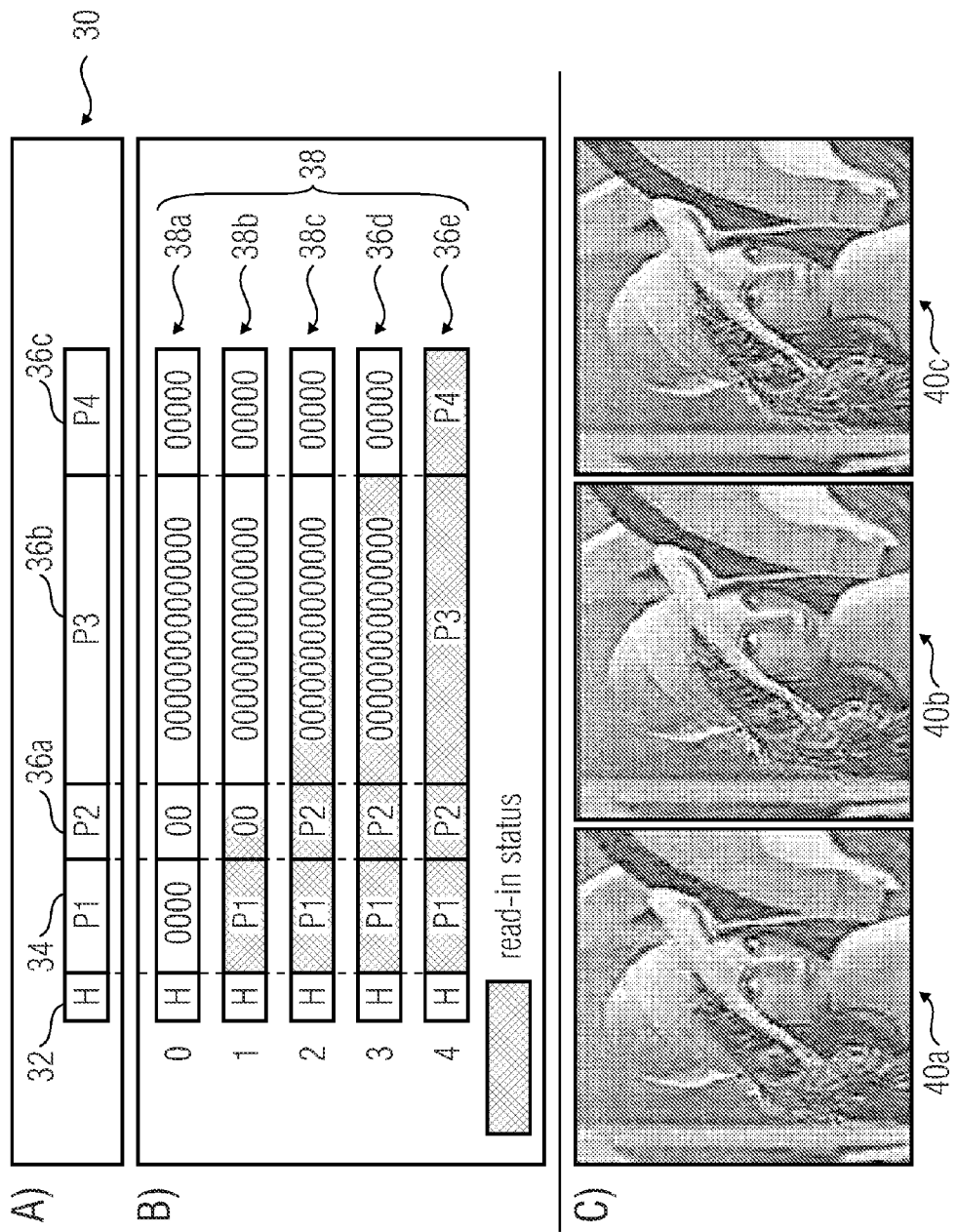
FIGS. 3a-3c show schematic illustrations of the process of reloading or repeatedly calling up (polling) a scalable image file.

It shall be noted with reference to FIG. 3 that the information packets 36a, 36b, and 36c of the extension information level may also comprise other extension information, e.g. for further details of the resolution, of the quality or another component in a restricted image area, and, consequently, cannot be restricted to extension information with regard to extended overall image resolution or overall image quality. It shall further be noted that a scalable file need not necessarily be a media file. For example, a text file may also comprise different levels, e.g. for organization, text body and graphics, which enables scalability thereof.

With reference to FIG. 4 it shall be noted that the set of proxy files 42 may be stored in a specific folder or container, such as in an MXF or AVI container, for example, which may also comprise information about the number of individual images and/or files as well as about the predefined frame rate. It shall also be noted that an image sequence wherein the individual frames are stored in a single file are cached in an analogous manner. Here, the set of proxy files 42 represents the actual proxy file wherein the first frame 44a in the information packets 48 is stored at different information levels, and the second frame 44b in the information packets 50 is also stored at different information levels. From this point of view, such a proxy file 42 combines, by analogy with the above-mentioned container of the set of proxy files 42, data (bytes) which belong together in terms of content. It shall further be noted that the proxy file 42 may comprise, e.g., only a first header, namely the header 47, or one header 47 and 49, respectively, for each frame 44a and 44b, the first header 47 typically having the structural information stored therein.

With reference to FIG. 5 it shall be noted that the device for caching may either be part of a main memory, of a processor, of a decoder, of a mass storage medium, or of a controller of the mass storage medium, so that the device is not necessarily limited to utilization at a specific location in the processing chain between the mass storage medium and the decoder.

The above-described device for caching may be used not only as a file system and/or for data storage, but may also be employed for image processing, e.g. in transcoding, for image archiving or, generally, for file management of scalable image files. Further fields of application are so-called content distribution and content streaming.

Even if embodiments of the present invention were explained above in connection with a device for caching, it shall be noted that the aspects explained above also relate to a method of caching a scalable original file having a first structure. The method comprises the step of generating the proxy file, the step being performed such that the proxy file is transferable to a second structure of its own account or directly comprises the second structure, which corresponds to the first structure of the original file. Moreover, the method comprises the step of reading out an information packet of a basic information level from the original file and the step of inserting the first information packet into the proxy file at a position determined by the second structure. In the last step, the proxy file is provided in the second structure, so that in the second structure, at least one of the information packets of a non-basic information level is replaced with an empty information packet. Consequently, the aspects that have been described in connection with a device also represent a description of the corresponding method, so that a block or a component of a device may also be understood as a corresponding method step or as a feature of a method step. By analogy therewith, aspects which have been described in connection with or as a method step shall also represent a description of a corresponding block or detail or feature of a corresponding device. Some or all of the method steps may be performed by a hardware apparatus (or while using a hardware apparatus), such as a microprocessor, a programmable computer or an electronic circuit, for example. In some embodiments, some or several of the most important method steps may be performed by such an apparatus.

An advantageous embodiment of the above-described device will be discussed below in detail while using different words. The invention report shows methods of incrementally improving image data in the event of several call-ups while using an adapted file-caching strategy for scalable media data, such as JPEG 2000 or H.264 SVC. In addition, displacement and/or replacement strategies for caching methods, which have also been developed for the properties of scalable (image) formats, will be introduced. Common caching methods discard entire files—or mark all of the blocks which belong to a cached file as free—so as to thereby free up storage space for new data. However, when using scalable media data, even the release of parts of a file—or of the blocks within the cache which cache parts of the file—may result in that, on the one hand, sufficient storage space becomes available for new data and that, on the other hand, there are still usable data of a file within the cache, e.g. images of a lower resolution and/or having a lower quality. As a result, it will not be necessary, in the event of a new request, to read from the supposedly slower mass storage. The methods introduced here may be combined and enable an increase in performance when storing, managing and providing scalable media data.

Digital movie distribution and archiving entails image compression in order to reduce the storage requirement. The Digital Cinema Initiative [1] defines utilization of JPEG 2000 [2] for distributing digital movies. Image sequences may be compressed at a data rate of up to 250 MBits/s. The same tendency may be observed in the field of digital archiving. Here, too, JPEG 2000 seems to be the codec desired since it offers both lossy and lossless compression. The data rates here are typically higher than in digital cinema. The International Organization for Standardization (ISO) has defined, specifically for the field of digital archiving, new JPEG 2000 profiles [3] having data rates of up to 500 MBits/s or even lossless compression.

For years it was impossible to decode such a JPEG 2000-compressed image sequence on a standard PC without any specific accelerator cards since the available computing resources of the processors were not sufficient. Presently, current processor families—as well as algorithms executed specifically on graphics cards [4]—provide the useful computing power so as to ensure real-time reproduction of the movies.

Unfortunately, these results resulted in a new bottleneck in the processing chain: current consumer hard disks are not able to provide the data within the appropriate amount of time so as to be able to reproduce a movie in real time (typically with 24 images per second). Especially external hard disks—connected via USB, for example—lack the resources that may be used. This results in that reproduction software may keep skipping frames during reproduction, even if the decoding performance that may be used were actually available.

Fortunately, JPEG 2000—besides other media formats such as H.264 SVC [5] or MPEG4 SLC [6]—is designed such that it allows scalability in various dimensions, e.g. quality or resolution. In this manner it is possible to discard specific packets of the data stream of the compressed file in the event of too low a computing performance of the target machine; as a result, the images will be smaller (scaling of the resolution) or lower in quality (scaling of the quality). Thus, scaling allows compensating for missing (decoding) resources. This is already made use of today at the application level.

Unfortunately, current caching methods so far have not utilized the functionality of scalability. This results in that in managing scalable media data, a so-called cache miss occurs with unnecessary frequency. In this case, a file which has already been read in—or a block of data which belongs to a file—can no longer be loaded from the cache since the latter had to free up the space for new data. This results in that the corresponding data may again be read from the typically slower memory (e.g. the hard disk). Complete replacement of all the data of a file within the cache for freeing up storage space also represents a useful approach for non-scalable file formats since a smaller portion of the data is of no use to the caller. When managing scalable files, it may be useful, however, to remove only a portion of a file—or the corresponding blocks within the cache memory—from the cache memory so as to thereby free up storage space for further data within the cache.

In addition, reproducing high-quality image material for digital archiving is an application which is above the performance limit of current consumer hard disks. The result is that hard disks cannot make available the requested data within the amount of time that may be used. At this point, too, the scalability of (image) data may be exploited since it is not necessarily the entire file that is sent to the caller. By combining the methods presented here and an adapted caching strategy for scalable media data, the requested images may be incrementally improved in terms of resolution and quality. The problem has been solved so far by the following methods:

Utilization of larger cache memories. As a result, a longer image sequence may be loaded into the cache. However, to this end the data may be requested at least twice. At the first time, the data is copied into the cache, however it cannot be made available within the amount of time that may be used. At the second request, the data is then read out from the fast cache.

Creation of proxy files. To this end, relatively small data packets, possibly in a different data format, are generated prior to viewing the material. As a result, the data volume is reduced, and real-time capability is achieved.

Re-coding at a reduced data rate. Results in a reduction in the image quality. Must be initiated beforehand. Results in two variants of the same media file which have to be managed.

Utilization of fast(er) hard disks with movable write/read heads. Current hard disks can already provide data for the field of application of digital cinema in real time even today. However, in the future one will have to expect that both image repetition rates and the data rates per second themselves—and, thus, the data throughput that may be used—will increase, so that this generation of hard disks will rapidly reach its limits. Moreover, said hard disks are costly, and utilization of faster hard disks is not always possible, particularly when they are connected via a limited I/O interface—such as USB, for example. In addition, even in this case, the data cannot be provided fast enough in the event that several data streams are requested (parallel reproducing of several videos).

Utilization of Flash memories. The same advantages and disadvantages as in the utilization of faster hard disks with movable write/read heads. The price is clearly higher in comparison (as of December 2011).

Combination of several hard disks in a so-called RAID system. In this manner, several hard disks (depending on the RAID system, different numbers of disks may be used) are combined so as to be able to achieve higher writing/reading speeds. Particularly with fixed installations, this is a frequently used method of increasing the performance of data memories. However, it is largely unsuitable for mobile applications (keyword: USB).

Read-in Strategy and File Caching:

The approach is to be explained by means of the compression format JPEG 2000. In principle, the methods may also be transferred to other formats. [7] provides a description of how scalable files may be filled up with so-called zero packets in order to circumvent bottlenecks in the provision of images by the storage medium while maintaining the original structure of the original file. The method presented provides as many data as may be read from the memory within a predefined period of time.

The method described may be adapted and extended by utilizing an adapted cache for scalable media data. Since it may be safely assumed that it had not been possible to completely read the image from the data carrier during a previous access operation, only part of the file was therefore provided to the calling application; incomplete or missing packets were replaced with zero packets. This smaller part is sufficient for being able to present the image in a reduced variant.

In addition, a method is feasible which continues reading, upon a renewed access operation to the same file, at that location of the original file at which the latest access operation to the storage medium ended—due to the specified timing. If the image (or the blocks of a file representing an image) has not been removed from the cache memory in the meantime, e.g. the quality of the image will improve with each new access operation since the data within the cache keep being added to and since more and more zero packets may be replaced with the correct data from the storage medium in the process. In particular, this method, too, exhibits real-time capability—a property that is very important in the post-production of the above-mentioned subject areas.

The difference as compared to a conventional method consists in that conventional methods do not take scalability into account. If the method introduced in [7] were employed without the extension described here, the file would be completely within the cache as early as after the first access operation, from the point of view of an operating system since, after all, the file system has already provided a complete file. However, a normal cache has no intelligence that would report that there are still a large number of zero packets in the cached data, and would simply provide, in the event of a new request, the data from the cache to the calling application. On account of the extension, the cache would try to improve the data which has already been cached.

In addition, a method is feasible which replaces, upon the first access operation, the zero packets in the cache with the correct data from the mass storage not only in the event that a renewed request has been made to a file, but which also incrementally reloads the data during writing/reading pauses of the mass storage so as to thereby improve the quality/resolution of the cached file.

FIG. 3 shows the approach in an iterative read-in method for scalable media data. A JPEG 2000 data stream (codestream) consists of a header packet and subsequent data packets (FIG. 3a), Orig.) each of which contains image data for the various scalable dimensions (resolution, quality, component, region (or region of interest). Prior to a first access operation to the file—in accordance with the substitution method of [7]—the structure of the file is replicated in the memory of the cache, and any packets existing in the codestream are filled up with zeros (FIG. 3a) Req 0).

It is irrelevant in this context whether storage space is actually created—for packets which are still unread—and is filled with zeros as early as at the first access operation, or whether a note concerning the packet which has not yet been loaded is sufficient. The second variant already represents an optimization with regard to capacity utilization of the memory since, in this manner, storage space is not unnecessarily created for zero packets. In the event of a concrete access operation, the system may also provide zeros without them being stored in the cache.

Following the first access operation, the situation will be as in FIG. 3a) (Req1): During the predefined time period already, it was possible to read so much data that the first packet (P1) is completely within the cache. In addition, the reading speed in the example allows that the subsequent packet (P2) has already been partly read. Due to the structure of the JPEG 2000 codestream, however, only packets which have been completely read in are allowed to be provided back to the calling application since otherwise invalid representation of the image would occur after decoding. Thus, the first access operation provides a codestream in which the first packet is filled with the data of the original image, and any further packets are filled with zeros. The result can be seen in picture 1b) (left-hand image): It can be recognized that the image exhibits marked block artifacts (e.g. at the edges) and that many details are missing.

Following the first access operation to the image, however, the data is not discarded but is stored in the cache presented here. Upon a new access operation to the file, reading is continued at that point where the first access ended. By means of access operations Nos. two and three to the same file (FIG. 3a) (Req 2 and Req 3), further packets may be loaded and stored in the cache. By analogy with the first access operation, only complete packets are provided to the caller—both access operations therefore provide the same result (cf. FIG. 3b) (central image)). The following access operation (FIG. 3a) (Req 4)) completely fills up the packets P3 and P4. The calling application obtains the image in FIG. 3b) (right-hand image), which provides a very high quality.

Displacement Methods for Scalable Files:

For any caching methods, the available memory (storage space) represents the limiting resource. For this reason there are a multitude of so-called displacement methods intended to delete precisely those files from the memory which are least likely to be required again in the short term. Without raising any claim to completeness, three known methods shall be mentioned here since they may also be combined at a later point in time with the newly presented methods:

1. FIFO (first in first out)—the file that was the first to be read in is removed.
2. LRU (least recently used)—the file not accessed for the longest period of time is removed.
3. LFU (least frequently used)—the file that has been least frequently used is removed.

All of these methods have in common that they will or will not completely remove a file (or the data blocks belonging to a file) from the cache. Partial removal is not aimed at since typically a portion of the file is of no use to the caller.

When using scalable files, however, it may be useful to remove only part of the file (or the corresponding blocks) from the cache since in this manner the image (or a movie, a song, etc.) will still be available in a reduced resolution. Therefore, upon the memory of the cache used filling up, those packets which contain data for the highest level of details will be discarded. Any other packets will remain in the cache. Because of the storage space being freed up, new entries may be inserted into the cache, and the storage bottleneck is remedied for the time being. Upon the memory filling up again, one will have to decide again which packets to discard. In this context it may be useful, e.g., to discard any packets which contain data for the highest level of resolution, etc. The approach set forth here may be combined with the methods presented in [7] in an ideal manner since said combination will ensure that the data structure is maintained and that any calling applications are not aware that the data in the cache has changed.

Depending on the structure of the files stored (how many quality levels/resolution levels, etc. are made available by an image), the extended displacement strategies cannot be employed indefinitely since, e.g., the resolution and quality cannot be reduced any further. In this case, those classic replacement strategies (FIFO, LFU, LRU) may be employed which completely remove the remainder of the images.

In particular, this invention report claims the following replacement strategies:

Any scalable dimensions existing in the source data. Said dimensions may be different in the different scalable data formats. JPEG 2000 allows, e.g., scaling in the dimensions of resolution, quality, component and region.

Combined exploitation of scalability: a combination of the scalable dimensions included, e.g. a method which first of all reduces the quality down to a maximum of 50% of the original quality and then reduces the resolution down to a maximum of 25% of the original resolution. But also a method which allows reduction down to 75% in terms of quality, then down to 75% in terms of resolution, then again down to 50% in terms of quality, etc.

A strategy which initially exploits scalability for replacement and subsequently falls back on the classic caching strategies.

A strategy which initially makes use of combined scalability (quality down to 50%, then the resolution down to 25%, etc.) and subsequently falls back on the classic caching strategies.

A strategy which keeps discarding those packets (irrespective of their dimensions) which free up the most storage space within the cache. Here, the cache may determine whether a larger amount of storage space may be freed up by, e.g., discarding the maximum resolution level or, even better, by discarding the maximum quality level of all of the images. Finally, the data of the dimension determined are deleted for all of the images.

A strategy which invariably discards those packets (regardless of their dimensions) which free up the most storage space within the cache. For each file, that data packet which releases the most data will be discarded.

A strategy which discards any incomplete packets of the scalable data so as to thereby free up storage space for new data.

A strategy which discards any packets which cannot be utilized for representation. This may be the case, e.g., when packets are indeed completely in the cache, but for reasons of codestream validity cannot be sent to the calling application for representation because other packets are missing.

A strategy which discards, upon the memory filling up, as many data of images (or files) which are completely in the memory as may be reloaded by the data carrier under real-time conditions upon a renewed access operation.

In this manner, it would invariably be the entire file that is provided: part of the data is available within the cache, the other part would be reloaded by the data carrier. In particular, this method might also be expediently used for non-scalable data formats.

Due to the utilization of caching methods while taking into account scalability, the performance of storage systems, in particular hard disks with movable write/read heads, Flash memories and memories which are connected via an interface having a highly limited data rate (e.g. USB), may be significantly improved. The methods presented enable accelerating access operations to files and providing higher quality of the data used than is possible with methods available today.

Even though the methods presented do not always provide the original files from the hard disk, in many application scenarios this is unnecessary. For example, when previewing a movie in a post-production house, it is often not important for the data to be reproduced with full resolution and quality. It is much more important that the data does not specifically have to be copied, for a short preview, onto a faster storage system in a time-consuming manner so that viewing of the data becomes possible at all. In addition—particularly in the above-mentioned fields of application—short sequences of a video sequence are viewed again and again in a loop mode. In this case, the methods introduced serve the purpose of real-time application including incremental improvement of the image quality upon each call.

The methods presented here might also be implemented at the application level. In this case, the corresponding end application rather than the file system would be the block that would be responsible for caching and corresponding replacement strategies.

In addition, one might try to place differently structured data, rather than zero packets, at that location where original data is missing.

Exchanging packets within a data stream describing a scalable (image) file in combination with a caching method optimized for scalable files so as to thereby increase the performance of storage systems also represents an embodiment. The invention presented may be utilized in the following fields of application:
  data storage
  data systems
  image processing, e.g. transcoding
  permanent storage (archiving) of image material
  data management for scalable image data
  content distribution
  content streaming A signal encoded in accordance with the invention, such as an audio signal or a video signal or a transport stream signal, for example, may be stored on a digital storage medium or may be transmitted on a transmission medium such as a wireless transmission medium or a wired transmission medium, e.g. the internet.

The audio signal encoded in accordance with the invention may be stored on a digital storage medium or may be transmitted on a transmission medium such as a wireless transmission medium or a wired transmission medium, e.g. the internet.

Depending on specific implementation requirements, embodiments of the invention may be implemented in hardware or in software. Implementation may be effected while using a digital storage medium, for example a floppy disk, a DVD, a Blu-ray disk, a CD, a ROM, a PROM, an EPROM, an EEPROM or a FLASH memory, a hard disk or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

Sources

[1] Digital Cinema Initiatives (DCI), "Digital Cinema System Specification V1.2", 7 Mar. 2008
[2] ISO/IEC 15444-1 "Information technology—JPEG 2000 image coding system—Part 1: Core coding system", 2000
[3] ISO/IEC 15444-1:2004/Amd 2:2009 "Extended profiles for cinema and video production and archival applications", 2009
[4] V. Bruns, H. Sparenberg, S. Fossel, "Video Decoder and Methods for Decoding a Sequence of Images", Patent, unpublished
[5] H. Schwarz, D. Marpe, T. Wiegand, "Overview of the Scalable Video Coding Extension of the H.264/AVC Standard", IEEE Transactions on Circuits and Systems for Video Technology, Vol. 17, No. 9, 2007
[6] R. Yu, R. Geiger, S. Rahardja, J. Herre, X. Lin, H. Huang, "MPEG-4 Scalable to Lossless Audio Coding", Audio Engineering Society, San Francisco, 2004
[7] U.S. Provisional Application 61/568/716

The invention claimed is:

1. A device for caching a scalable original file which comprises a first structure comprising a header and a plurality of information packets for different information levels, comprising:
   a cache memory configured to cache a proxy file and/or information packets of the proxy file; and
   a proxy file generator configured to generate the proxy file such that the proxy file is transferable into a second structure of its own account or directly comprises the second structure, said second structure corresponding to the first structure of the original file; wherein
   the proxy file generator is further configured to read out a first information packet of a basic information level from the original file and insert it into the proxy file at a position specified by the second structure and to output the proxy file in the second structure, so that in the second structure, at least one of the information packets of a non-basic information level is replaced with an empty information packet;
   the proxy file generator includes a second interface, via which the proxy file generator is connected to a decoder or a processor to which the proxy file or the set of proxy files is output; and
   the decoder or the processor expects, on the basis of information stored in the header, a number of information packets or a size for each information packet.

2. The device as claimed in claim 1, wherein the proxy file generator is configured to read out, prior to outputting the proxy file, further information packets of the non-basic information level from the original file and to insert them into the proxy file at a position specified by the second structure, so that the second structure of the proxy file corresponds to the first structure.

3. The device as claimed in claim 1, the cache memory comprising a further cache memory configured to cache the information packets during readout and prior to insertion into the proxy file.

4. The device as claimed in claim 1, wherein the cache memory is configured to store structural information by means of which the first information packet is to be supplemented by empty information packets so as to transfer the proxy file into the second structure.

5. The device as claimed in claim 1, wherein the scalable original file is a media file, a video file or an audio file.

6. The device as claimed in claim 1, wherein the non-basic information levels are extension information levels which include information from a group of information including information with regard to extended resolution, extended quality or an extended component.

7. The device as claimed in claim 1, wherein the original file comprises information packets for successive frames or is part of a set of original files which comprises one original file for each of successive frames, and
   wherein the proxy file generator is further configured to read out a first information packet of a basic information level for a first frame from the original file or from the set of original files and to insert the first information packet into the proxy file or into a set of proxy files, and
   to read out a further information packet of the basic information level for a subsequent frame from the original file or from the set of original files and to insert said further information packet into the proxy file or into the set of proxy files at a position specified by the second structure for the subsequent frame.

8. The device as claimed in claim 7, wherein the original file or the set of original files comprises a frame rate for the successive frames associated with it with which the proxy file or the set of proxy files is to be output.

9. The device as claimed in claim 8, wherein the proxy file generator is further configured to repeat said readout and insertion for a number of information packets of the non-basic information level, which is dependent on the frame rate and readout speed of the readout of the information packets from the original file or from the set of original files.

10. The device as claimed in claim 7, wherein the proxy file generator is further configured to log a read-in status which indicates information packets of the non-basic information level which are yet to be loaded and which, when the proxy file or the set of proxy files is output, are not yet read out from the original file or from the set of original files or which are replaced with an empty information packet in the second structure when the proxy file or the set of proxy files is output, and
   the proxy file generator further being configured to read out, once outputting of the proxy file or of the set of proxy files has been stopped, an information packet of the information packets that are yet to be loaded for a predetermined frame from the original file or from the set of original files and to insert it into the proxy file or the set of proxy files at a location specified by the second structure.

11. The device as claimed in claim 10, wherein the proxy file generator is further configured to stop outputting of the proxy file or of the set of proxy files upon a signal from a receiver or requester of the proxy file or of the set of proxy files.

12. The device as claimed in claim 10, wherein the proxy file generator is further configured to read out the information packet of the information packets which are yet to be loaded for the predetermined frame upon a signal from a receiver or requester to repeatedly output the proxy file or the set of proxy files from the predetermined frame onward, and to insert said information packet into the proxy file or into the set of proxy files.

13. The device as claimed in claim 1, comprising a transmission rate determiner for determining a readout speed of said readout of the information packets from the original file or from the set of original files.

14. The device as claimed in claim 13, wherein an order is defined among the information packets for each frame, and wherein the proxy file generator is configured to perform the repetition for a current frame for such time until a change to a next frame is predefined by the frame rate.

15. The device as claimed in claim 13, wherein an order is defined among the information packets for each frame, and wherein the proxy file generator is further configured to cache an incompletely read-out part of a currently read-out information packet in the cache memory or in a further cache memory and to not insert the incompletely read-out information packet into the proxy file or into the set of proxy files, or to output the proxy file or the set of proxy files such that the incompletely read-out information packet is replaced with an empty information packet.

16. The device as claimed in claim 1, wherein the proxy file generator comprises a first interface, via which the proxy file generator is connected to a mass storage on which the original file or the set of original files is stored.

17. The device as claimed in claim 1, wherein the device is integrated into a decoder, a mass storage or a working memory.

18. A method of caching a scalable original file which comprises a first structure comprising a header and a plurality of information packets for different information levels, comprising:
producing, by a first processor, a proxy file such that the proxy file is transferable into a second structure of its own account or directly comprises the second structure, which corresponds to the first structure of the scalable original file;
reading out a first information packet of a basic information level from the original file;
inserting the first information packet into the proxy file at a position specified by the second structure;
providing the proxy file in the second structure, so that in the second structure, at least one of the information packets of a non-basic information level is replaced with an empty information packet; and
outputting the proxy file or the set of proxy files to a decoder or a second processor; wherein
the decoder or the second processer expects, on the basis of information stored in the header, a number of information packets or a size for each information packet.

19. A non-transitory computer readable medium including a computer program comprising a program code for performing, when the program runs on a computer, the method of caching a scalable original file which comprises a first structure comprising a header and a plurality of information packets for different information levels, said method comprising:
producing a proxy file such that the proxy file is transferable into a second structure of its own account or directly comprises the second structure, which corresponds to the first structure of the scalable original file;
reading out a first information packet of a basic information level from the original file;
inserting the first information packet into the proxy file at a position specified by the second structure;
providing the proxy file in the second structure, so that in the second structure, at least one of the information packets of a non-basic information level is replaced with an empty information packet; and
outputting the proxy file or the set of proxy files to a decoder or a processor; wherein
the decoder or the processer expects, on the basis of information stored in the header, a number of information packets or a size for each information packet.

* * * * *